Aug. 4, 1964     J. PICKLES     3,142,998
REVERSIBLE DRIVE TRANSMISSION
Filed March 20, 1961     2 Sheets-Sheet 1

INVENTOR.
JOSEPH PICKLES
BY Whittemore
Hulbert & Belknap
ATTORNEYS.

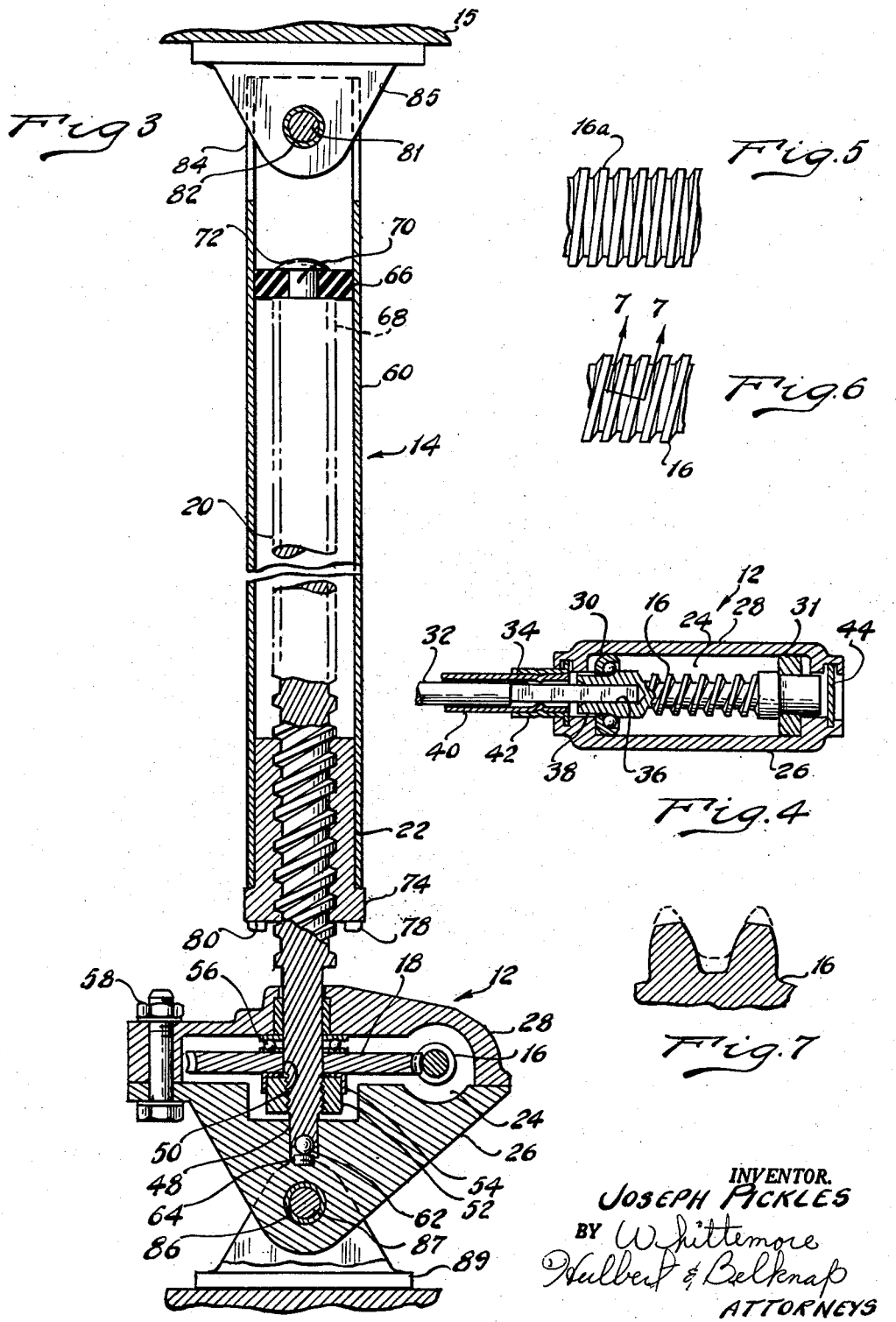

United States Patent Office 3,142,998
Patented Aug. 4, 1964

3,142,998
REVERSIBLE DRIVE TRANSMISSION
Joseph Pickles, Dearborn, Mich., assignor to Ferro Stamping Company, Detroit, Mich., a corporation of Michigan
Filed Mar. 20, 1961, Ser. No. 96,925
8 Claims. (Cl. 74—424.8)

The invention relates to reversible drive transmissions and refers more specifically to lifting assemblies for raising and lowering the roof of a convertible automobile or similar structure which include a reversible nut and screw extensible link and reversible worm and worm gear actuating means for the extensible link which extensible link and actuating means combination is constructed to be driven in either direction by the usual drive means therefor and which may be driven in only one direction by normal use forces acting thereon and wherein the worm and/or worm gear are corrected to provide the necessary drive efficiency and mechanical advantage while adequate strength within required size limitations is maintained.

In the past extensible link, worm and worm gear powered lifting assemblies have usually been irreversible under normal use forces. That is to say the usual lifting assemblies which may be power driven in opposite direction may not be driven by forces applied externally thereto during use. As a result of this irreversibility of the lifting assemblies normal external forces acting on the devices after they have been driven to one limiting position tend to bind the assemblies and lock them against being driven in a reverse direction by the usual driving means therefor. Further since many devices actuated by powered lifting assemblies normally include separate locking means for securing the devices in one limiting position thereof after they have been driven thereto preventing driving of the lifting assemblies in the opposite direction by normal forces acting thereon by means integral with the lifting assemblies is not required. However since such devices are not usually provided with separate means for locking them in the other limiting position thereof and the normal forces tending to bind the lifting assemblies in the other limiting position are insufficient to produce binding it is sometimes desirable to prevent driving of the lifting assemblies from said other limiting position by normal use forces by means integral with the lifting assemblies.

Thus in the case of convertible tops for automobiles, if the lifting assemblies therefor which are driven in both directions by the usual means are not capable of being driven in a lowering direction to some degree by normal forces such as wind acting thereon, the normal forces may cause the lifting assemblies to bind and prevent lowering of the top by the usual drive means. Also, separate means are normally provided for locking the tops in a raised position while separate means for locking the tops in a lowered position are seldom provided so that for neatness of appearance and efficiency of storage of the lowered top it is desirable to prevent any tendency of normal use forces to raise the top from the down position thereof.

Additionally lifting assemblies are usually restricted in size so that they may be operated in a particular space provided therefor. Strength, efficiency and mechanical advantage limitations are also usually set on lifting assemblies. Therefore, it is usually essential to provide maximum strength, efficiency and mechanical advantage in lifting assemblies of any given size.

It is therefore a purpose of the present invention to provide an improved lifting assembly which is constructed to be driven in reverse in one direction by normal use forces.

Another object is to provide a top lifting assembly including a screw and nut extensible link actuated by a worm and worm gear which lift assembly is constructed to be driven in reverse in only one direction by normal use forces.

Another object is to provide a top lifting assembly as set forth above wherein the helix angle of the threads of the screw and nut is such as to permit rotation therebetween on application of an axial force therebetween.

Another object is to provide a top lifting assembly as set forth above wherein the extensible link comprises a hollow tube, one end of which tube has longitudinal slots extending thereinto, a feed nut having radially outwardly projecting abutments thereon which abutments are fitted within the slots in said tube, the one end of the tube being spun over the feed nut to secure the feed nut in assembly within the tube whereby axial and rotational movement of the feed nut with respect to the tube is prevented, and a feed screw engaged with said feed nut and telescoping into the tube.

Another object is to provide a top lifting assembly as set forth above wherein the actuating means for the extensible link includes a worm gear sleeved over one end of said feed screw and clamped between a nut threaded on the feed screw on one side and a bearing urged against the other side by means of a housing cover and a driven bearing mounted worm in engagement with the worm gear.

Another object is to provide a top lifting assembly as set forth above wherein the helix angle of the worm and worm gear and the mounting therefor are such as to permit driving of the worm in one direction on application of a rotational force to the worm gear.

Another object is to provide a top lifting assembly as set forth above wherein the mounting of the worm and worm gear are such as to prevent driving of the worm in one direction on application of a rotational force to the worm gear.

Another object is to provide a top lifting assembly as set forth above wherein the worm gear is restricted in diameter and therefore in number of teeth due to strength requirements, and wherein the worm helix angle is determined by required efficiency, and mechanical advantage, and the worm is corrected by extending the usual addendum of the teeth and increasing the root diameter thereof to substantially eliminate the usual dedendum to provide required strength at a pitch determined by the teeth spacing of the worm gear.

Another object is to provide a top lifting assembly including a screw and nut extensible link having a helix angle providing irreversibility of operation but insufficient in itself to provide a required mechanical advantage actuated by a worm and worm gear having a helix angle providing irreversibility of operation which is also insufficient in itself to provide a required mechancal advantage, but which in combination with the screw and nut extensible link provides the required mechanical advantage.

Another object is to provide a lifting assembly which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 3 is a longitudinal section of the extensible link and actuating mechanism of the top lift assembly shown in FIGURE 1 taken on the line 3—3 in FIGURE 1.

FIGURE 4 is a section of the actuating mechanism of the top lift assembly shown in FIGURE 1 taken on the line 4—4 in FIGURE 2.

FIGURE 5 is a diagrammatic representation of a worm having a low helix angle.

FIGURE 6 is a diagrammatic representation of worm having a higher helix angle than the worm illustrated in FIGURE 5 with the same pitch and therefore a smaller root diameter.

FIGURE 7 is an enlarged partial section view of the worm illustrated in FIGURE 6 taken on the line 7—7 in FIGURE 6 illustrating the extension of the usual addendum thereof and the increase in root diameter to provide increased worm strength.

With particular reference to the drawings one embodiment of the invention will now be disclosed.

Figure 1:
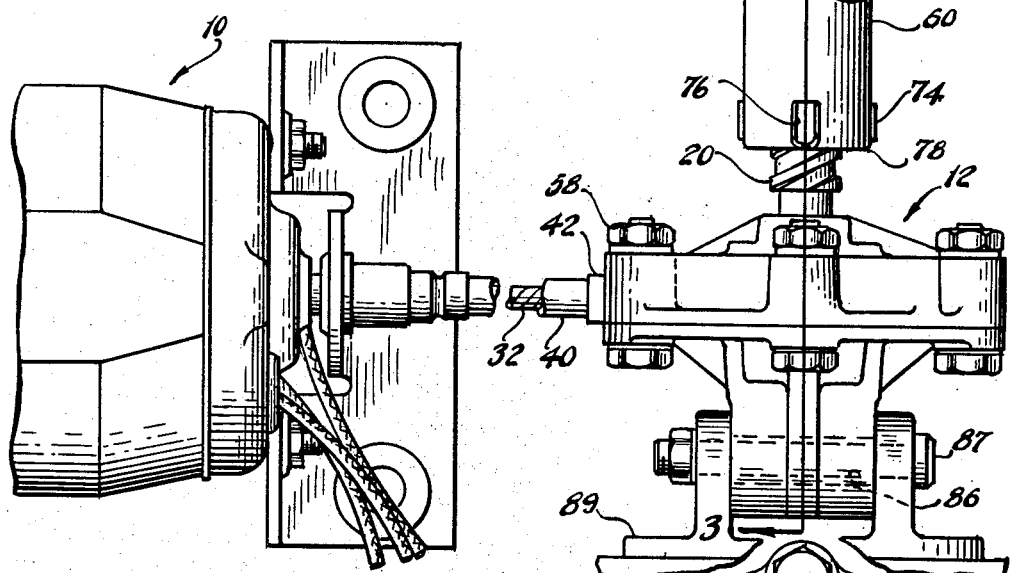
FIGURE 1 is an elevation view of a portion of a top lift assembly constructed in accordance with the invention.
Figure 2:
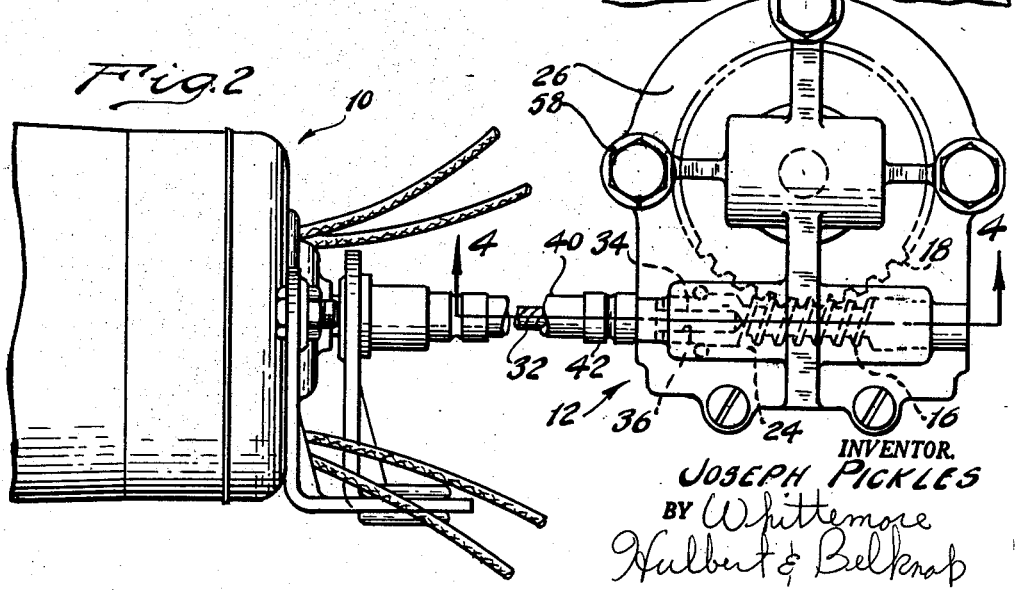
FIGURE 2 is a bottom view of the top lift assembly shown in FIGURE 1.

As shown in FIGURE 1 the lifting assembly of the invention comprises a motor 10 which may be electrically operated in the usual manner to cause the worm and worm gear actuating mechanism 12 to extend or retract the nut and screw extensible link 14. The motor 10 may be connected to a pair of actuating mechanisms 12 for extending or retracting a pair of extensible links 14 located at opposite sides of an automobile which are operable to raise or lower a convertible automobile top 15 in accordance with the direction of rotation of motor 10. Inasmuch as the actuating mechanisms 12 and the extensible links 14 at each side of the motor 10 would be identical only one actuating mechanism and extensible link will be considered.

According to the invention, as illustrated best in FIGURE 3, the actuating mechanism 12 comprises a worm 16 and worm gear 18. The worm gear may be driven on rotation of the worm in either direction. In addition the worm 16 may be driven in one direction on rotation of the worm gear 18. A feed screw 20 and feed nut 22 which are relatively rotatable on application of relative axial forces thereto are provided in combination with the worm 16 and worm gear 18. The actuating mechanism and extensible link together provide a lifting assembly adapted to be driven in only one direction by normal usage stresses whereby binding of the lifting assembly under normal usage stresses in the one direction is prevented.

More specifically the worm 16 is positioned in the cylindrical cavity 24 formed in the housing base 26 and cover 28 as illustrated in FIGURES 3 and 4. The worm 16 is supported in the cavity 24 by means of bearing 30 at one end and the friction bushing 31 at the other end as shown in FIGURE 4.

Bearing 30 permits rotation of worm 16 by motor 10 to drive the extensible link 14 in an up direction and rotation of worm 16 due to rotation of the worm gear 18 on application of a relative axial force between the feed screw 20 and feed nut 22 due to normal usage forces with the top 15 in an up position since the thrust on the worm 16 is to the left in FIGURE 4 at this time. Friction bushing 31 permits driving of the worm 16 by motor 10 in a direction to lower the extensible link 14 since the axial thrust to the right in FIGURE 4 will be negligible as lowering of the top is gravity aided and the motor is sufficient to overcome any resistance to rotation of the worm offered by friction bushing 31. Raising of the automobile top 15 by means of forces applied thereto externally of the usual drive means therefor is however prohibited due to thrust applied to the worm 16 to the right in FIGURE 4 when such raising of the top is attempted and consequent frictional resistance to rotation developed between the worm 16, friction bushing 31 and housing member 26.

Thus the convertible top 15 may be driven up or down by motor 10 in the usual manner. In addition movement of the lifting assembly in a lowering direction due to normal stresses acting thereon in a raised position is provided for to prevent binding of the lifting assembly. Further the convertible top is not permitted to move in a raising direction due to normal usage forces applied thereto after it has been driven to a lowered position whereby the lowered roof is always maintained in a fixed predetermined position to improve the appearance of and prevent damage to the lowered roof.

The worm 16 is driven by motor 10 through the torsion member 32 having a non-circular end 34 received within the end of the non-circular recess 36 in the end 38 of the worm 16. The torsion member 32 is surrounded by a non-rotating shield 40 and is rotatably driven by the motor 10. The shield 40 and torsion member 32 may be flexible or rigid on either or both sides of the motor 10 as will be understood by those in the art.

Crimped connector 42 is provided between the shield 40 and the housing base 26 and cap 28 as shown best in FIGURE 4. Plug 44 closes the end of the cavity 24 opposite the end 38 of worm 16.

The worm gear 18 of the actuating mechanism 12 is sleeved over the end 48 of the feed screw 20 and is rotatably connected thereto as by a non-circular screw cross section and similar opening 50 through the worm gear 18. The exact position of the worm gear 18 axially of the feed screw 20 is determined by the positioning of the nut 52 threaded on the end 48 of the feed screw 20 and having bearing collar 54 secured thereto. The worm gear 18 is clamped in a fixed position relative to the feed screw 20 by means of the bearing 56 also sleeved over the feed screw 20 and the cap 28 of the actuating mechanism housing which is secured to the base 26 of the housing by convenient means, such as the bolts 58. If desired the bearing 56 may be a friction bushing similar to bushing 31 and the bushing 31 may then be replaced by a bearing similar to bearing 30. The resultant resistance to raising movement of top 15 due to normal usage forces applied thereto externally of the lifting assembly while lowering movement due to such forces is permitted would be the same.

The worm gear 18 is limited in diameter due to the usual space limitations for the lifting assembly. Thus the number of teeth on the worm gear 18 are also limited by the strength requirement thereof. With the worm gear 18 characteristics fixed a worm 16a having the usual helix angle as indicated in FIGURE 5 which will not permit rotation of the worm by the worm gear is sufficiently strong to rotate worm gear 18 when it is driven by motor 10 to cause extension of extensible link 14.

However to permit rotation of the worm 16 by the worm gear 18 as the feed screw 20 of the extensible link 14 is rotated due to normal usage forces acting thereon it is necessary to provide a larger helix angle on the worm and worm gear. Since the helix angle of the worm must be increased with the teeth at the same pitch due to the limitation on the diameter and strength of the worm gear the diameter of the worm gear must be made smaller as shown in FIGURE 6. The strength of the worm 16 is then below requirements.

Therefore in accordance with the invention the worm 16 is corrected to bring the strength thereof back to the required strength. This is accomplished as illustrated in FIGURE 7 wherein the addendum of the teeth of the worm gear is increased and the root diameter thereof is likewise increased as shown in dotted lines. It will be understood that the worm gear could be similarly corrected; however, the corrections to the worm gear are preferably only those necessary to insure that the worm gear is conjugate to the corrected worm.

The extensible link 14 of the top lifting assembly of the invention comprises the feed screw 20, feed nut 22 and elongated sleeve 60 assembled as shown best in FIGURE 3. The feed screw 20, as shown in FIGURE 3, is provided with a bearing 62 at the end 48 thereof engageable with the bearing plate 64 when the feed screw 20 is assembled with the actuating mechanism 12 as shown. A guide piston 66 is secured on the end 68 of the feed screw 20 by means of a reduced diameter section 70 over which the annular guide piston 66 is sleeved, the axially outer end of the feed screw 20 being spun over to provide a head 72 as shown.

Feed nut 22 is threaded on the feed screw 20 in assembly as shown and is provided with the angularly spaced radial abutments 74 which are fitted within the similarly angularly spaced axial slots 76 in the end 78 of the sleeve 60 as shown. The end 78 of the sleeve 60 is then spun over the end 80 of the feed nut whereby the feed nut 22 is secured in assembly with the sleeve 60 against relative rotation and axial movement.

The sleeve 60 may be pivotally secured to the automobile top 15 or other device which it is desired to raise and lower by a pivot pin 81 extending through the transverse opening 82 in the end 84 thereof and engaging the bracket 85 rigidly attached to the top 15 as will be understood by those in the art.

The feed screw 20 and feed nut 22 have threads pitched to permit relative rotation therebetween on application of a relative axial force thereto. Thus normal use forces such as wind producing an axial compressive force on sleeve 60 will cause rotation of feed screw 20 and consequently of worm gear 18 and worm 16 in the lowering direction rather than producing binding thereof and consequent locking of the lifting assembly against driving through worm 16. Rotation of the feed screw 20 in the other direction by tension forces in sleeve 60 is prevented by the friction bushing 31 as previously considered.

In operation the motor 10 is secured in a fixed position to the floor of an automobile having a convertible top 15 which it is desired to open and close by means of the top lift assembly of the invention. The housing base 26 is pivoted to the floor of the automobile by means of a pivot pin 87 extending through the passage 86 therein and engaging bracket 89 secured to the automobile floor. Sleeve 60 is pivoted to the top as previously indicated, and with the top in a down position, the motor 10 is energized to rotate the feed screw 20 to cause extension of the extensible link 14. When the top is completely in the up position thereof the motor 10 is stopped and the top is locked in the up position by separate lock means (not shown) which will initially allow axially downward forces to be applied to the sleeve 60 due to components of normal usage forces such as wind forces or the like.

If either the actuating means 12 or extensible link 14 were irreversible in a downward direction such initial forces would tend to bind the feed screw 20 and nut 22 or the worm 16 and worm gear 18 and lock them against subsequent driving by the motor 10. Since both the actuating means and extensible link of the lifting assembly of the invention in combination are reversible in the downward direction under the initial forces, the forces only produce slight rotation of the feed screw, worm and worm gear so that the stresses in the sleeve 60 are reduced and subsequent forces are resisted by the separate lock means.

It will be recognized that in combining a worm and worm gear actuating means with a feed screw and nut reversible in at least one direction in combination, a lifting assembly is provided having a required mechanical advantage which neither the reversible extensible link or the reversible worm and worm gear alone are capable of providing due to the helix angle required to provide reversibility thereof.

When it is desired to lower the top 15 the separate lock means (not shown) are unlocked and the motor 10 drives the actuating means 12 to telescope the feed screw 20 into the sleeve 60. The top is prevented from any tendency to return to the up position due to normal stresses applied thereto due to the non-reversibility of the feed screw 20 and feed nut 22 in combination with the worm gear 18 and worm 16 with the friction bushing 31 mounting as previously indicated.

The drawings and the foregoing specification constitute a description of the improved reversible drive transmission in such full, clear, concise and exact terms as to enable any person skilled in the art to practice the invention, the scope of which is indicated by the appended claims.

What I claim as my invention is:

1. A lift assembly for use in raising or lowering the top of a convertible automobile or similar device comprising a feed screw and a feed nut extensible link including a hollow sleeve pivoted to the top at one end, a feed nut secured in the other end of the hollow sleeve and a feed screw engaged with the feed nut, a two-part pivotally mounted housing having a chamber therein, one part of the housing having an opening therethrough through which one end of the feed screw extends into said chamber, a bearing plate within the chamber opposite the opening and bearing means operable between the bearing plate and the end of the feed screw within the housing, a bearing and a feed screw driving worm gear sleeve over the feed screw and positioned within the chamber, a nut threadedly engaged with the end of the feed screw for vertically positioning the worm gear and gearing in the chamber, means securing said one part of the housing to the other part thereof to positively locate the worm gear in conjunction with the nut, a worm in mesh with said worm gear in said chamber one end of which is freely rotatably supported and the other end of which is supported for rotation in a friction bushing whereby the worm may be driven in only one direction on application of an axial force to the extensible link and means connected to the worm for positively driving the worm in opposite directions.

2. A lift assembly as claimed in claim 1 wherein the other end of the sleeve is provided with angularly spaced axially extending slots therein, the feed nut is provided with similarly angularly spaced radially extending abutments thereon fit within the slots, and the other end of the sleeve extends radially inwardly over an end of the feed nut to prevent relative axial and radial movement between the feed nut and sleeve.

3. A worm having size, strength and helix angle restrictions for use in conjunction with a worm gear similarly having size, strength and helix angle restrictions which worm has a larger addendum dimension than a worm conjugate with the same worm gear and having the same pitch and a smaller helix angle.

4. A worm having size, strength and helix angle restrictions for use in conjunction with a worm gear similarly having size, strength and helix angle restrictions which worm has a larger root diameter than a worm conjugate with the same worm gear and having the same pitch and a smaller helix angle.

5. A worm having size, strength and helix angle restrictions for use in conjunction with a worm gear similarly having size, strength and helix angle restrictions which worm has a larger addendum dimension and root diameter than a worm conjugate with the same worm gear and having the same pitch and a smaller helix angle.

6. A lift assembly for use in raising or lowering the top of a convertible automobile or similar device comprising a feed screw and a feed nut extensible link including a hollow sleeve pivoted to the top at one end, a feed nut secured in the other end of the hollow sleeve and a feed screw engaged with the feed nut, a two-part pivotally mounted housing having a chamber therein, one part of the housing having an opening therethrough through which one end of the feed screw extends into said chamber, a bearing plate within the chamber opposite the opening and bearing means operable between the bearing plate and the end of the feed screw within the housing, a bearing and a feed screw driving worm gear sleeve over the feed screw and positioned within the chamber, a nut threadedly engaged with the end of the feed screw for vertically positioning the worm gear and gearing in the chamber, means securing said one part of the housing to the other part thereof to positively locate the worm gear in conjunction with the nut, a worm in mesh with said worm gear, means rotatably mounting said worm in said chamber and means connected to the worm for positively driving the worm in opposite directions.

7. Structure as set forth in claim 1 wherein the worm and worm gear have size, strength and helix angle restrictions and the worm has a larger addendum and root diameter than a worm conjugate with the same worm gear and having the same pitch and a smaller helix angle.

8. Structure as set forth in claim 7 wherein said means rotatably mounting said worm in said chamber comprises a bearing through which one end of the worm extends and a friction bushing supporting the other end of the worm for preventing rotation of the worm on application of an axial force to the worm in one direction.

References Cited in the file of this patent
UNITED STATES PATENTS

| | | |
|---|---|---|
| 2,682,780 | Pickles | July 6, 1954 |
| 2,818,744 | Moody | Jan. 7, 1958 |
| 2,851,137 | Gravenstine | Sept. 9, 1958 |
| 2,905,012 | Lohr et al. | Sept. 22, 1959 |